United States Patent [19]

Taniguchi

[11] Patent Number: 4,765,729

[45] Date of Patent: Aug. 23, 1988

[54] ANTI-REFLECTION OPTICAL ARTICLE

[75] Inventor: Takashi Taniguchi, Shiga, Japan

[73] Assignee: Toray Industries, Inc., Tokyo, Japan

[21] Appl. No.: 857,477

[22] Filed: Apr. 30, 1986

[30] Foreign Application Priority Data

Apr. 30, 1985 [JP] Japan .................................. 60-91010
Jun. 28, 1985 [JP] Japan ................................ 60-140185
Sep. 18, 1985 [JP] Japan ................................ 60-206055

[51] Int. Cl.$^4$ ........................... G02C 7/02; B32B 5/16
[52] U.S. Cl. .................................... 351/163; 428/328; 428/331; 428/329; 428/336; 428/412; 428/416; 428/429; 428/425.5; 428/433; 428/434; 428/448; 428/447; 428/502; 428/507; 428/518; 428/520; 427/164; 427/165; 350/276 R; 350/165
[58] Field of Search ............... 428/328, 336, 331, 447, 428/422, 448; 427/164; 350/163, 165, 276 R

[56] References Cited

U.S. PATENT DOCUMENTS 4,361,598  11/1982  Yoldas ........................... 427/164 X
4,374,158   2/1983  Taniguchi et al. ............. 427/164 X
4,410,563  10/1983  Richter et al. ................. 427/164 X
4,417,790  11/1983  Dawson et al. ................ 427/164 X Primary Examiner—P. C. Ives
Attorney, Agent, or Firm—Birch, Stewart, Kolasch & Birch

[57] ABSTRACT

An anti-reflection optical article, which comprises a substrate, a single-layer or multi-layer anti-reflection film having a surface film composed of an inorganic substance, which is formed on the substrate, and a coating of an organic substance containing a curing material formed on the surface of the anti-reflection film, wherein the surface reflectance of the optical article is lower than 3% and the stationary contact angle to water is at least 60°.

9 Claims, No Drawings

ANTI-REFLECTION OPTICAL ARTICLE

BACKGROUND OF THE INVENTION (1) Field of the Invention

The present invention relates to an anti-reflection optical article having excellent stain resistance, scratch resistance and processability and a process for the preparation of this optical article. More particularly, the present invention relates to an optical article which is valuably used as optical elements, for example, optical lenses such as spectacle lenses and camera lenses, and filters to be used as front plates of CRT (cathode ray tube) and Braun tubes to be used for CRT.

(2) Description of the Related Art

When an object is seen through a transparent material, if reflected rays are strong and a reflected image is clear, the ability to see is disturbed, and reflected images, such as so-called ghosts or flares, are formed to give an unpleasant feel to the eyes. Moreover, in the case of a looking glass, the content cannot be clearly seen because of rays reflected from the glass surface.

As means for preventing reflection, there has been adopted a method in which a substrate is covered with a material having a refractive index different from that of the substrate. It is known that in order to increase the reflection-preventing effect in this method, selection of the thickness of the substance covering the substrate is important. Namely, it is known that in the case of, for example, a single-layer coating, adjustment of the optical thickness of the substance having a refractive index lower than that of the substrate to $\frac{1}{4}$ of the wavelength of the objective light or an odd number multiple thereof gives a minimum reflectance, that is, a maximum transmission.

The optical thickness referred to herein is given by a product of the refractive index of the coating-forming material and the thickness of the coating. An anti-reflection layer having a multi-layer structure can be formed, and several proposals have been made in connection with selection of the thickness of the coating layer [A. Vasicek, "Optics of Thin Films", 159–283, North-Holland Publishing Company, Amsterdam (1960)].

U.S. Pat. No. 4,361,598 and U.S. Pat. Application Ser. No. 474,741, now abandoned, disclose a process in which a multi-layer anti-reflection film satisfying the above-mentioned optical thickness condition is formed by using a liquid composition.

In an anti-reflection film formed by the vacuum deposition method, the film-forming material is composed mainly of an inorganic oxide or inorganic halide, and essentially, the anti-reflection film has a high surface hardness, but it is readily stained with hand dirt, finger marks, sweat, hair liquid, hair spray and the like and it is difficult to remove these strains. Furthermore, since the surface slip is poor, thick scratches are readily formed. In addition, since the water wettability is large, if rain drops or water splashes adhere, water broadly spreads, and in case of a spectacle lens or the like, the observed object is seen distorted over a broad area.

In anti-reflection films disclosed in Japanese Unexamined Patent Publications No. 58-46301, No. 59-49501 and No. 59-50401, in order to impart a high surface hardness, it is necessary that an inorganic substance represented by fine particles of silica should be incorporated in an amount of at least 30% by weight in a topcoat layer. However, an anti-reflection film formed from such a film composition is poor in the surface slip and is readily scratched by rubbing with a cloth or the like.

Various surface treating agents have been proposed and marketed as means for eliminating these drawbacks, but since each of them is soluble in water or solvents, the function which is provided, is a temporary one and the durability is poor.

We made research with a view to solving the foregoing problems involved in the conventional techniques, and as the result, we have arrived at the present invention described hereinafter.

SUMMARY OF THE INVENTION

It is a primary object of the present invention to provide an anti-reflection optical article excellent in stain resistance, scratch resistance and processability.

Another object of the present invention is to provide a process in which such an optical article is prepared without degradation of the appearance characteristics owing to interference color unevenness.

In accordance with one aspect of the present invention, there is provided an anti-reflection optical article, which comprises a substrate, a single-layer or multi-layer anti-reflection film having a surface film composed of an inorganic substance, which is formed on the substrate, and a coating of an organic substance-containing a curing substance formed on the surface of the anti-reflection film, wherein the surface reflectance of the optical article is lower than 3% and the stationary contact angle to water is at least 60°.

In accordance with another aspect of the present invention, there is provided a process for the preparation of anti-reflection optical articles, which comprises forming a single-layer or multi-layer anti-reflection film composed of an inorganic substance on the surface of a substrate, coating a curable organic material-containing substance consisting of a water-repellent liquid composition on the surface of the anti-reflection film, and curing the coating.

DETAILED DESCRIPTION OF THE PREFERRED EMBODIMENTS

In the present invention, the single-layer or multi-layer anti-reflection film composed of an inorganic substance is formed from a composition comprising at least 30% by weight of an inorganic oxide, an inorganic halide or a composite thereof. As means for forming this film, there can be mentioned various PVD methods (physical vapor deposition methods) such as a vacuum deposition method, an ion plating method and a sputtering method, and coating methods using a liquid composition capable of forming a film comprising at least 30% by weight of an inorganic substance after the coating, such as a spin coating method, a dip coating method, a curtain flow coating method, a roll coating method, a spray coating method or a cast coating method.

As the inorganic substance preferably used for the PVD method, there can be mentioned $SiO_2$, $MgF_2$, $AlF_3$, $BaF_2$, $CaF_2$, $LaF_3$, $LiF$, $Na_3AlF_6$, $Na_5Al_3F_{14}$, $NaF$ and $SrF_2$. In case of a glass substrate, $MgF_2$, $CaF_2$ and $Na_5Al_3F_{14}$ are preferably used because the refractive index is low, that is, a film having a high anti-reflection effect can be given. On the other hand, in case of a plastic substrate, an inorganic substance having a relatively low refractive index and a good hardness, such as $SiO_2$, is preferably used.

As the inorganic substance preferably used for the coating method using a liquid composition, there can be mentioned a hydrolysis product of a silicate represented by the following general formula [I]:

$$Si(OR)_4 \qquad [I]$$

wherein R stands for an alkyl group, an acyl group or an alkoxyalkyl group, and finely divided silica, especially colloidally dispersed silica sol.

It is indispensable that the surface layer film formed by the PVD method or the liquid composition-coating method should comprise at least 30% by weight of the inorganic substance. If the content of the inorganic substance is lower than 30% by weight, no sufficient surface hardness can be obtained and prominent improvements of the stain resistance and scratch resistance, intended in the present invention, cannot be attained.

The finely divided silica-containing film obtained by using the above-mentioned colloidally dispersed silica sol contains finely divided silica having an average particle size of 1 to 200 nm, preferably 5 to 150 nm. As the finely divided silica, there can be mentioned a sol of silica colloidally dispersed in a hydrophilic solution such as water or an alcohol, and hydrophobic finely divided silica obtained by the esterification of the surfaces of particles of the above-mentioned silica sol with a long-chain alcohol. The content of the finely divided silica in the film should be determined according to the object and use, but in order to improve the hardness, enhance the adhesion to the substrate and prevent formation of cracks, it is preferred that the content of the finely divided silica be 2 to 80% by weight, especially 5 to 70% by weight. If the average particle size is smaller than 1 nm, the stability of the particles is poor and products having a uniform quality cannot be obtained. If the average particle size exceeds 200 nm, the transparency of the film is low and products having a good appearance cannot be obtained.

As the component (hereinafter referred to as "vehicle component") other than the finely divided silica, any material can be used if the transparency is not degraded. For example, there may be used polyvinyl acetate, a saponification product thereof, an acrylic polymer, a cellulose compound, a melamine resin, an epoxy resin, a polyorganosiloxane resin, a polyvinyl butyral resin and a urethane resin. These vehicles may be used singly or in the form of mixtures of two or more of them. Instead of thermoplastic vehicles, there may be used crosslinked products. The use of crosslinked products is effective for improving such properties as heat resistance, hot water resistance and chemical resistance. In order to improve the surface hardness, a polyorganosiloxane resin is preferably used among the above-mentioned vehicles. As a typical instance of the composition forming a polyorganosiloxane resin, there can be mentioned an organic silicon compound represented by the following general formula [II]and/or a hydrolysis product thereof.

$$R^1{}_a R^2{}_b Si(OR^3)_{4-a-b} \qquad [II]$$

wherein $R^1$ and $R^2$ each stand for an alkyl group, an alkenyl group, an aryl group or a hydrocarbon group having a halogen group, an epoxy group, a glycidoxy group, an amino group, a mercapto group, a methacryloxy group or a cyano group, $R^3$ stands for an alkyl group having 1 to 8 carbon atoms, an alkoxyalkyl group, an acyl group or a phenyl group, and a and b are 0 or 1 and (a+b) is 1 or 2.

As typical instances of the organic silicon compound, there can be mentioned trialkoxysilanes, triacyloxysilanes and triphenoxysilanes such as methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-aminopropyltrimethoxysilane, γ-meroaptopropyltrimethoxysilane, γ-mercaptopropyltriethoxysilane, N-β-(aminoethyl)-γ-aminopropyltrimethoxysilane, β-cyanoethyltriethoxysilane, methyltriphenoxysilane, chloromethyltrimethoxysilane, chloromethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γglycidoxypropyltributoxysilane, γ-glycidoxypropyltrimethoxyethoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltrimethoxyethoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane and hydrolysis products thereof, and dialkoxysilanes, diphenoxysilanes and diacyloxysilanes such as dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, methylvinyldiethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldimethoxyethoxysilane, γ-glycidoxypropylmethyldiphenoxysilane, γ-glycidoxypropylethyldimethoxysilane, γ-glycidoxypropylethyldiethoxysilane, γ-glycidoxypropylethyldipropoxysilane, γ-glycidoxypropylvinyldimethoxysilane, γ-glycidoxypropylvinyldiethoxysilane, γ-glycidoxypropylphenyldimethoxysilane, γ-glycidoxypropylphenyldiethoxysilane and hydrolysis products thereof.

These organic silicon compounds may be used singly or in the form of mixture of two or more of them. In order to impart a dyeability, it is preferred that an organic silicon compound containing an epoxy group or glycidoxy group be used.

In order to improve such properties as weatherability and sweat resistance and enhance the anti-reflection effect by reduction of the refractive index of the coating film, it is preferable to use an organic silicon compound having a methyl group, a γ-chloropropyl group or a vinyl group.

In order to lower the curing temperature and promote the advance of curing, it is preferred that these organic silicon compounds be used in the hydrolyzed state.

The hydrolysis product may be prepared by adding pure water or an acidic aqueous solution such as hydrochloric acid, acetic acid or sulfuric acid to the organic silane compound and stirring the mixture. The degree of the hydrolysis can be easily controlled by adjusting the amount added to pure water or the acidic aqueous solution. In order to promote curing, it is especially preferred that pure water or the acidic aqueous solution be added in an amount of 1 to 3 moles per mole of the group $OR^3$ in the general formula [II].

Since an alcohol or the like is formed by the hydrolysis, it is possible to perform the hydrolysis in the absence of a solvent, but in order to perform the hydrolysis uniformly, it is possible to carry out the hydrolysis after the organic silicon compound is mixed with a solvent. An appropriate amount of an alcohol or the like formed by the hydrolysis may be removed by heating and/or under a reduced pressure according to need, and an appropriate solvent may be added after the removal of the alcohol or the like. As the solvent, there can be mentioned alcohols, esters, ethers, ketones, halogenated hydrocarbon and aromatic hydrocarbons such as toluene and xylene. A mixed solvent of two or more of these solvents may be used according to need. In order to promote the hydrolysis reaction and advance precondensation or other reaction, it is possible to elevate the temperature above room temperature. Needless to say, the hydrolysis temperature may be reduced below room temperature so as to control precondensation.

In order to modify the organic polysiloxane resin, for example, in order to improve the adhesion to a plastic substrate and improve the dyeability of the coating film, it is preferred that an epoxy resin be added.

The thickness of the surface film should be determined depending on the required properties other than the anti-reflection effect, but in order to attain a highest anti-reflection effect, it is preferred that the optical thickness of the surface film be ¼ of the wavelength of the objective light or an odd number multiple thereof. In this case, a minimum reflectance, that is, a maximum transmission, can be given.

Incidentally, the optical thickness is given by a product of the refractive index of the film-forming material an the thickness of the film.

The lower layer located below the above-mentioned surface film is not particularly critical. More specifically, the surface film may be formed directly on the substrate, but in order to enhance the anti-reflection effect, it is preferred that at least one layer having a refractive index higher than that of the surface film be coated on the substrate. Several proposals as mentioned have been made on the thickness and refractive index of the surface film in such multi-layer anti-reflection films.

In order to obtain an optical article having an electromagnetic wave-shielding property and an antistatic effect as well as a anti-reflection effect, it is preferred that at least one layer of the multi-layer film be transparent and electroconductive. As the transparent electroconductive layer, there can be mentioned films of metals such as Au, Ag and Al, and films of inorganic oxides such as tin oxide, indium oxide and a mixture thereof. An inorganic oxide film of the latter type is preferable because the absorption in the visible ray range is very small.

According to the present invention, a layer of an organic substance containing a curing material is formed on the surface of the single-layer or multi-layer anti-reflection film having the surface layer composed mainly of an inorganic substance. The organic substance-containing curing substance referred to herein is a substance containing a three-dimensionally crosslinkable substance. It is indispensable that the surface reflectance of the optical article after formation of the curing coating should be lower than 3% and the stationary contact angle to water should be at least 60°. The surface reflectance referred to herein means the total ray reflectance on the curing coating-formed surface. In case of an optical article having an anti-reflection film and an organic substance-containing curing coating on each of both the surfaces, the reflectance on both the surfaces should be lower than 6%. If the surface reflectance of the optical article after formation of the curing coating is not lower than 3%, attainment of the anti-reflection effect cannot be expected. In the case where the optical article is colorless and transparent, ½ of the value obtained by subtracting the total ray transmission from 100% may be regarded as the reflectance of one surface.

If the surface reflectance is not lower than 3%, in case of a spectacle lens, a reflected image such as ghost or flare is produced to give an unpleasant feeling to eyes, and in case of a filter for looking glass, CRT, the content or displayed figure is rendered obscure by rays reflected on the surface.

Furthermore, it is indispensable that in the optical article after formation of the curing coating, the stationary contact angle should be at least 60°. The stationary contact angle referred to herein is one determined according to the liquid drop method in which a water drop having a diameter smaller than 2 mm is formed on the optical article and the contact angle is measured. If the stationary contact angle to water is smaller than 60°, the effect of improving the stain resistance is insufficient and the surface slip is degraded. When it is desirable to improve the water-repellent effect, it is preferred that the stationary contact angle be at least 75°.

The organic substance containing the curing material is not particularly critical, so far as the above-mentioned requirements of the surface reflectance and stationary contact angle to water are satisfied. However, room temperature-curing type or low temperature-curing type organic polysiloxane polymers are preferred, and a polydimethylsiloxane polymer is especially preferred because the stationary contact angle can be increased when this polymer is used. As the curing polysiloxane, there can be mentioned compositions formed by mixing polyalkyl-, polyalkenyl- and polyarylsiloxanes such as polydimethylsiloxane, polymethylphenylsiloxane and polymethylvinylsiloxane with various crosslinking agents, for example, tetrafunctional silanes such as tetraacetoxysilane, tetraalkoxysilane, tetraethylmethylketooximesilane and tetraisopropenylsilane or trifunctional silanes such as alkenyltriacetoxysilane, triketooximesilane and triisopropenylsilane, and products formed by reacting such compositions in advance. As another polysiloxane having a curing property, there can be mentioned a cured product obtained by reacting a polysiloxane having an Si-H linkage with a compound having an unsaturated group in the presence of a platinum compound. As still another effective example, there can be mentioned a fluorine-containing mixture, especially a polymer containing a perfluoro group-containing (meth)acrylate or a copolymer containing this (meth)acrylate and other monomer. A functional group is introduced into this polymer so as to effect crosslinking and curing. For example, a copolymer formed by introducing a hydroxyl group-containing hydroxyl (meth)acrylate or a carboxyl group-containing monomer such as (meth)acrylic acid into the above-mentioned polymer may be used. Moreover, a copolymer with a monomer having a double bond differing in the reactivity, such as allyl (meth)acrylate, can be mentioned as the crosslinkable polymer. The polymerization state of the copolymer is not limited to the above-mentioned polymerization state, but random copolymerization and block copolymerization can be adopted. In order to improve the water repellancy and the adhesion to the material to be coated, it is preferable to use a block copolymer.

In the anti-reflection film of the present invention, in order to obtain a sufficient surface hardness, it is preferred that a single-layer or multi-layer film composed mainly of silicon dioxide be formed as the outermost layer.

In the single-layer or multi-layer anti-reflection film having a surface layer film composed substantially of silicon dioxide, it is preferred that the surface be coated with a substance composed of a silanol-terminated organic polysiloxane. As silanol-terminated organic polysiloxane, there can be mentioned terminal silanol group-containing polyalkyl-, polyalkenyl- and polyarylsiloxanes such as polydimethylsiloxane, polymethylphenylsiloxane and polymethylvinylsiloxane. The molecular weight of the silanol-terminated organic polysiloxane is not particularly critical, but in view of the stability and handling property, it is preferred that a silanol-terminated organic polysiloxane having a number average molecular weight of 1,000 to 1,000,000, especially 2,000 to 500,000, be used. A product having terminal silanol group may be obtained by hydrolyzing a monomer such as dimethyldichlorosilane, dimethyldialkoxysilane or dimethyldiacetoxysilane. Of course, a silanol-terminated organic polysiloxane may be obtained by further advancing the condensation reaction.

In order to promote curing or render the above-mentioned curable, a curing agent or a crosslinking agent may be added to the above-mentioned composition. For example, there may be used a silicone resin-curing agent, a silane coupling agent, a metal alkoxide, a metal chelate compound, an isocyanate compound, a melamine resin, a polyfunctional acrylic resin and a urea resin.

The method for curing the organic substance-containing substance should be determined according to the anti-reflection substrate and the kind of the substance used. Ordinarily, curing is effected by a heat treatment at a temperature higher than room temperature and lower than 250° C. or by irradiation with radiant rays such as ultraviolet rays, electron beams or γ-rays while utilizing a curable functional group such as a double bond in the polymer or oligomer.

In the case where the organic substance-containing the curing material is not cured, the coating is readily dropped from the optical article at the washing step or by contact with a chemical, and the intended effect cannot be attained. Namely, a product having a good durability cannot be obtained.

The thickness of the coating composed of the organic substance containing the curing material is not particularly critical, but in view of the relation between the anti-reflection effect and the stationary contact angle to water, it is preferred that the thickness of the coating be 0.0005 to 0.5 μm, especially 0.001 to 0.3 μm.

A coating method adopted for the ordinary coating operation may be adopted, but in view of the uniformity of the anti-reflection effect and the control of the reflection interference color, spin coating, dip coating and curtain flow coating are preferably adopted. In view of the operation efficiency, it is most preferable to adopt a method in which a material such as paper or cloth is impregnated with the coating liquid and flow coating is effected.

The organic substance-containing curing substance is ordinarily diluted with a volatile solvent and is then coated. The kind of the solvent is not particularly critical, but an appropriate solvent is selected while taking the stability of the composition, the wettability with the inorganic substance and the volatility into consideration. A mixture of two or more of solvents may be used.

In view of the uniform coating property, it is preferred that a composition described below be used for the organic polysiloxane polymer, that is, a coating composition consisting of a homogeneous solution comprising (A) a curable organic silicon compound, (B) a solvent capable of dissolving the organic silicon compound therein and (C) a solvent incapable of dissolving the organic silicon compound therein. Any of curable organic silicon compounds can be used as the component (A), and many organic silicon compounds as exemplified hereinbefore may be used. The components (B) and (C) are compounds customarily used as solvents, and the combined use of the component (B) capable of dissolving the organic silicon compound therein and the component (C) incapable of dissolving the organic silicon compound therein is preferred in view of the uniform coating property.

The content of the component (A) in the coating composition used in the present invention can be changed according to the intended use, the coating method and the coating conditions. In view of the fact that only the surface characteristics are improved, a content of 0.0001 to 5.0% by weight is especially preferred for the component (A).

The kinds of the components (B) and (C) should be determined according to the organic silicon compound used. As the solvent (B) in which the organic silicon compound is soluble, there can be mentioned esters such as butyl acetate, ethers such as diethylene glycol dimethyl ether, aliphatic hydrocarbons such as hexane and Isoper E, aromatic hydrocarbons such as benzene, toluene and xylene, halogenated hydrocarbons such as trichloroethylene, and ketones such as methylisobutylketone.

As the solvent (C) in which the organic silicon compound is insoluble, there can be mentioned esters such as ethyl acetoacetate, alcohols such as methylcellosolve, diacetone alcohol and benzyl alcohol, cyclic ethers such as dioxane, and cyclic ketones such as cyclohexanone. As the components (B) and (C), there may be used mixed solvents comprising at least two solvents.

The mixing ratio between the components (B) and (C) should be determined depending on the kind of the component (A), the substance to be coated and the coating conditions, but in order to reduce the influence of the coating atmosphere and increase the productivity, it is preferred that the component (B)/component (C) weight ratio be from 95/5 to 40/60, especially from 92.5/7.5 to 45/55.

The coating composition of the present invention comprising the above-mentioned components (A), (B) and (C) should be a homogeneous solution. If the coating composition is heterogeneous, the cured organic silicon coating film is uneven and the appearance and performance characteristics are degraded.

Curing agents and crosslinking agents as mentioned hereinbefore may be added to the coating composition so as to promote curing or render the composition curable.

Substances having no reactivity may be added to the curing substance of the present invention, so far as transparency, durability and other properties are not drastically degraded. For example, a surface active agent may be added to improve the flow characteristic, and a dimethylsiloxane/alkylene oxide block or graft copolymer or a fluorine type surface active agent is especially effective.

Any of optical articles may be used as the substrate in the present invention, but in view of the adaptability to the liquid coating operation, a glass substrate or plastic material is especially preferred.

As the plastic material, there are preferably used homopolymers and copolymers of methyl methacrylate, polycarbonates, diethylene glycol bisallyl carbonate polymer (CR-39), polyesters, especially polyethylene terephthalate, unsaturated polyesters, acrylonitrilestyrene copolymers, vinyl chloride resins, polyurethane resins and epoxy resins.

Glass can also be preferably used. Moreover, the present invention may be applied to an anti-reflection film comprising as the substrate a glass or plastic material, as mentioned above, coated with a coating material such as a hard coat. In the anti-reflection optical article of the present invention, such properties as adhesion, hardness, chemical resistance, durability and dyeability can be improved by the inorganic substance constituting the anti-reflection film as the lower layer.

A known surface hardness-increasing coating for a plastic material can be used so as to improve the hardness (see the specifications of U.S. Pat. No. 3,986,997 and U.S. Pat. No. 4,211,823). Moreover, an oxide of a metal such as titanium, aluminum, silicon or tin may be coated or an acrylic crosslinked product obtained from (meth)acrylic acid and pentaerythritol may be coated.

When the organic substance-containing curing substance is coated according to the present invention, the surface of the anti-reflection film composed substantially of the inorganic substance is preferably cleaned by removal of stains by a surface active agent, degreasing with an organic solvent or vapor washing with Freon. Various pre-treatments are effective for improving the adhesion and durability, and an activating gas treatment and a chemical treatment with an acid or alkali are especially preferred.

The anti-reflection optical article obtained according to the present invention is hardly stained as compared with the ordinary anti-reflection film, and the stain is inconspicuous. Moreover, stains can be removed very easily. Furthermore, since the surface slip is good, the surface is hardly scratched. Since these excellent properties are durable, the anti-reflection optical article of the present invention can be preferably used as optical lenses such as spectacle lenses, camera lenses and binocular lenses, various displays, especially CRT displays, and front face plates thereof.

The anti-reflection multi-layer film of the present invention may be subjected to the surface analysis by ESCA (X-ray photoelectric spectrophotometric method). According to this method, the surface of a sample placed in high vacuum is irradiated with X-rays, and photoelectrons going out from the surface are detected by energy division by an analyzer. Typical measurement conditions are as follows.

Measurement apparatus: ESCA 750 supplied by Shimazu Seisakusho
Exciting X-rays: Mg-K$\alpha$ rays (1253.6 eV)
Output power of X-rays: 8 KV, 20 mA
Temperature: 20° C.
Vacuum degree: below $5 \times 10^{-5}$ Pa
Pretreatment of sample: not effected
Correction of energy: the value of the bond energy of the $C_{ls}$ main peak is corrected to 284.6 eV The single-layer or multi-layer anti-reflection film of the inorganic substance, which is located below the coating of the organic substance-containing curing substance, may be analyzed by Auger electron spectroscopy. According to this method, the surface of a sample placed in high vacuum is irradiated with electron beams, and Auger electrons going out from the surface are analyzed by energy division by an analyzer. Typical measurement conditions are as follows.

Measurement apparatus: JAMP-105 supplied by Nippon Denshi K.K.
Vacuum degree at analysis of top surface: $1 \times 10^{-7}$ Pa
Vacuum degree at analysis in depth direction: $6 \times 10^{-6}$ Pa (Ar atmosphere)
Sampling: sample is fixed to a sample stand by pressing the sample end by a steel plate
Acceleration voltage: 3.0 KV
Sample current: $1 \times 10^{-8}$ A
Beam diameter: 1 $\mu$m
Slit: No.5
Sample inclination angle: 40° to 70°
Acceleration voltage for Ar ion etching: 3.0 KV
Sample current for Ar ion etching: $3 \times 10^{-7}$ A
Ar etching speed: 200Å/min (in case of $SiO_2$)

The present invention will now be described in detail with reference to the following examples that by no means limit the scope of the invention. Incidentally, in the examples, all of "parts" are by weight.

EXAMPLE 1 AND COMPARATIVE EXAMPLE 1

(1) Preparation of Coating Composition

A beaker was charged with 128.7 parts of γ-glycidoxypropylmethyldiethoxysilane, and 18.7 parts of a 0.05N aqueous solution of hydrochloric acid was dropped little by little while maintaining the liquid temperature at 10° C. to effect hydrolysis. After completion of the dropwise addition, 69.3 parts of γ-chloropropyltrimethoxysilane was added to the reaction liquid and 18.9 parts of a 0.01N aqueous solution of hydrochloric acid was dropped little by little while cooling the liquid to 10° C. to obtain a hydrolyzed silane. After completion of the dropwise addition, 451.6 parts of silica sol dispersed in methanol (solid content=30%), 34.4 parts of diethylene glycol dimethyl ether, 263.8 parts of methyl alcohol, 1.5 parts of a silicone type surface active agent and 13.5 parts of aluminum acetylacetonate were added to the reaction liquid and the mixture was sufficiently stirred to obtain a coating composition.

(2) Preparation of Coated Lens

A lens was dipped in an aqueous solution of sodium hydroxide, washed sufficiently with water and dried, and both the surfaces of the lens were dip-coated with the coating composition prepared in (1) above at a pull-up speed of 10 cm/min and the lens was heated and dried at 90° C. for 4 hours to obtain a coated lens.

(3) Preparation of Anti-Reflection Film

On both the surfaces of the lens, $ZrO_2/TiO_2/Y_2O_3$, $Ta_2O_5$ and $SiO_2$ were formed on the resin coating formed in (2) above in this order according to the vacuum deposition method so that the optical film thickness was $\lambda/4$ ($\lambda = 540$ nm).

The anti-reflection plastic molded article had a green reflection interference color, and the total ray transmission was 98.12%.

(4) Preparation of Organic Substance-Containing Curing Coating Composition

In 10 parts of Isoper E, which is a hydrocarbon solvent, was dissolved 10 parts of dimethylpolysiloxane (having a number average molecular weight of 26,000) having silanol groups on both the ends, and 1 part of ethyltriacetoxysilane and 0.05 part of dibutyltin diacetate were added to the solution. The mixture was allowed to stand still at room temperature a whole day and night. Then, 1080 parts of toluene was added to the mixture to form a homogeneous solution. The solution was filtered and purified to obtain a coating composition.

(5) Coating and Curing

The surface of the anti-reflection film obtained in (3) above was dip-coated with the coating composition obtained in (4) above at a pull-up speed of 2 cm/min. The coated film was allowed to stand still at room temperature a whole day and night, whereby curing was effected and an anti-reflection optical article was obtained.

(6) Evaluation of Properties

The properties of the obtained optical article were evaluated according to the following methods. For comparison, the optical article not coated with the organic substance-containing curing substance was similarly tested. The obtained results are shown in Table 1.

(a) Stationary Contact Angle to Water

By using a contact angle meter (Model CA-D supplied by Kyowa Kagaku K.K.), a water drop having a diameter of 1.5 mm was prepared on the top end of the needle and the top point of the needle was brought into contact with the topmost part of the convex surface of a lens to form a liquid drop. The angle between the liquid drop and the surface was measured and designated as the stationary contact angle.

(b) Appearance

The reflection interference color and its uniformity and opacity were observed with the naked eye.

(c) Anti-Reflection Effect

The total ray transmission (Ti) was measured and the surface reflectance of one surface was calculated according to the following formula, and the anti-reflection effect was evaluated:

Anti-reflection effect (surface reflectance) = (100 − Ti)/2

In the surface reflectance of one surface was lower than 3%, ghost or flare was not substantially observed, and no practical trouble was caused.

(d) Stain Resistance Test

On the concave surface of the lens, 5 ml of city water was dropped, and the lens was allowed to stand still in a room temperature atmosphere for 48 hours. The lens surface was wiped by a cloth and the state of the residual fur was examined. When the fur could be removed, it was judged that the stain resistance was good, and if the fur could not be removed, it was judged that the stain resistance was bad.

(e) Surface Slip

The surface of the lens was scratched by the finger, and the state of catching of the finger on the lens surface was checked and the surface slip was evaluated according to the following scale.
o: not caught at all
Δ: caught by strong scratching
x: caught even by weak scratching

(f) Durability Test

The surface was rubbed 20 times with paper impregnated with acetone, and the above-mentioned stain resistance test was carried out. When the fur could be removed, it was judged that the durability was good, and when the fur could not be removed, it was judged that the durability was bad.

COMPARATIVE EXAMPLE 2

The procedures of Example 1 were repeated in the same manner except that a terminal-blocked uncuring dimethylpolysiloxane (having a number average molecular weight of 26,000) was used for formation of the coating composition in (4) of Example 1. The durability was bad. Accordingly, it was found that if an uncuring substance is used, the durability is poor.

EXAMPLE 2 AND COMPARATIVE EXAMPLE 3

The procedures of Example 1 were repeated in the same manner except that the optical article having the anti-reflection film, to be coated, was changed to the following article. In Comparative Example 3, the article not coated with the coating composition was tested. The obtained results are shown in Table 1.

(1) Preparation of Anti-Reflection Film

A plano lens of crown glass was coated with magnesium fluoride by the vacuum deposition method to obtain a lens having an anti-reflection film.

EXAMPLE 3

The procedures of Example 1 were repeated in the same manner except that the organic substance-containing curing coating composition and the curing conditions were changed as described below. The obtained results are shown in Table 1.

(1) Preparation of Organic Substance-Containing Curing Coating Composition

To 20 parts of an A-B type acrylic block copolymer comprising a fluoroalkyl group as one component (Modiper F110 supplied by Nippon Yushi K.K., hydroxyl value=36, solid content=30%) were added 5.06 parts of a 15% by weight solution of Coronate EH (supplied by Nippon Polyurethane Kogyo K.K.) in methylisobutylketone/cyclohexanone (40/60 weight ratio) and 0.34 part of a 0.0001% by weight solution of dibutyltin dilaurate in methylisobutylketone/cyclohexanone (40/60 weight ratio), and the mixture was stirred to form a solution. Then, 1.2 parts of the solution was diluted with 135.2 parts of methylisobutylketone and 202.8 parts of cyclohexanone to form a coating composition.

(2) Curing Method

Heat curing was carried out for 1 hour in a drier in which hot air maintained at 100° C. was circulated.

mixture was sufficiently stirred to form a coating composition.

(2) Preparation of Coated Lens

A lens formed of a polymer of diethylene glycol bisallyl carbonate was dipped in an aqueous solution of sodium hydroxide, washed sufficiently with water and dried. Then, both the surfaces of the lens were dipcoated with the coating composition prepared in (1) above at a pull-up speed of 10 cm/min and then heated and dried at 90° C. for 4 hours to obtain a coated lens.

(3) Preparation of Anti-Reflection Film

On both the surfaces of the coated lens prepared in (2) above, $ZrO_2$-$TiO_2$-$Y_2O_3$, $Ta_2O_5$ and $SiO_2$ were coated on the coating layer of the lens in this order by the vacuum deposition method so that the optical thickness was $\lambda/4$ ($\lambda=540$ nm).

The reflection interference color of the obtained anti-reflection plastic molded article was green, and the total ray transmission was 98.12%.

(4) Preparation of Organic Substance-Containing Curing Coating Composition

To 10 parts of Isoper E, which is a hydrocarbon solvent, was added 10 parts of dimethylpolysiloxane (having a number average molecular weight of 26,000) having a silanol group on both the ends to form a solution, and 1 part of ethyltriacetoxysilane and 0.05 part of dibutyltin diacetate were added to the solution and the mixture was allowed to stand still at room temperature a whole day and night. Then, components (B) and (C) shown in Table 2 were added to the mixture to form a coating composition.

(5) Coating and Curing

TABLE 1

| | | | Test Results | | | |
|---|---|---|---|---|---|---|
| | Contact Angle | Appearance | Anti-Reflection Effect | Stain Resistance | Surface Slip | Durability |
| Example 1 | 106.0 | good | 0.95 | good | o | good |
| Comparative Example 1 | 40.1 | good | 0.95 | bad | x | — |
| Example 2 | 95.0 | good | 1.72 | good | o | good |
| Comparative Example 3 | 58.8 | good | 1.57 | bad | x | — |
| Example 3 | 110.0 | good | 1.57 | good | o | good |

EXAMPLE 4 THROUGH 8

(1) Preparation of Coating Composition

A beaker was charged with 128.7 parts of γ-glycidoxypropylmethyldiethoxysilane, and 18.7 parts of a 0.05N aqueous solution of hydrochloric acid was added little by little while maintaining the liquid temperature at 10° C. to effect hydrolysis. After completion of the dropwise addition, 69.3 parts of γ-chloropropyltrimethoxysilane was added to the reaction liquid, and 18.9 parts of a 0.01N aqueous solution of hydrochloric acid was added little by little to the reaction liquid while cooling the liquid to 10° C. to form a hydrolyzed silane. After completion of the dropwise addition, 451.6 parts of a silica sol dispersed in methanol (solid content=30%), 34.4 parts of diethylene glycol dimethyl ether, 263.8 parts of methyl alcohol, 1.5 parts of a silicone type surface active agent and 13.5 parts of aluminum acetylacetonate were added to the reaction liquid and the The surface of the anti-reflection film prepared in (3) above was dip-coated at a pull-up speed of 10 cm/min with the coating composition prepared in (4) above. The coated anti-reflection film was allowed to stand still at room temperature a whole day and night, whereby curing was effected and an anti-reflection article was obtained.

(6) Evaluation of Properties

The properties of the obtained article were evaluated according to the following methods. The obtained results are shown in Table 2.

(a) Appearance

The reflection interference color and its uniformity and opacity were examined with the naked eye.

(b) Stability of Coating Composition

The coating composition was allowed to stand still at room temperature a whole day and night, and the solution state was examined.

TABLE 2

| | Component (B) | | Component (C) | | Test Results | |
|---|---|---|---|---|---|---|
| | Kind | Amount (parts) | Kind | Amount (parts) | Appearance | Stability |
| Example 4 | MIBK | 540 | cyclohexanone | 540 | almost good | good |
| Example 5 | MIBK | 648 | cyclohexanone | 432 | good | good |
| Example 6 | MIBK | 864 | cyclohexanone | 216 | good in central portion | good |
| Example 7 | toluene | 648 | cyclohexanone | 432 | good | good |
| Example 8 | MIBK | 648 | dioxane | 432 | good in central portion | good |

Note
MIBK: methylisobutylketone

EXAMPLE 9

(1) Preparation of Substrate Having Coating Film Containing Fine Particles of Silica

(a) Preparation of Hydrolyzed Silane

To 10° C. was cooled 106.8 parts of γ-glycidoxypropylmethyldiethoxysilane, and 15.5 parts of a 0.05N aqueous solution of hydrochloric acid was gradually added with stirring. After completion of the dropwise addition, the mixture was stirred at room temperature for 1 hour to obtain a hydrolyzed silane.

(b) Preparation of High-Hardness Coating Composition

To the above-mentioned hydrolyzed silane were added 25 parts of an epoxy resin (Epikote 827 supplied by Shell Chemical K.K.), 25 parts of an epoxy resin (Epolite 3002 supplied by Kyoeisha Yushi Kagaku Kogyo K.K.), 58.9 parts of diacetone alcohol, 29.5 parts of benzyl alcohol, 310 parts of methanol and 1.5 parts of a silicone type surface active agent, and 416.7 parts of the same methanol dispersion of colloidal silica as used in Example 1 and 12.5 parts of aluminum acetylacetonate were further added and the mixture was sufficiently stirred to form a coating composition.

(c) Coating, Curing and Pre-treatment of High-Hardness Coating Composition

A lens of a diethylene glycol bisallylcarbonate polymer (CR-39 plano lens having a diameter of 71 mm and a thickness of 2.1 mm), which had been dipped in an aqueous solution of sodium hydroxide and washed, was dip-coated at a pull-up speed of 10 cm/min with the coating composition prepared in (b) above at a coating composition temperature of 20° C., and the coated lens was heat-cured at 93° C. for 4 hours. The cured lens was pre-treated at an oxygen flow rate of 250 ml/min and an output of 50 W for 1.5 minutes by using a surface-treating plasma device (Model PR501A supplied by Yamato Kagaku K.K.).

(d) Preparation of High-Refractive-Index Intermediate Coating Composition

A beaker provided with a rotor was charged with 253.4 parts of n-propanol, 169 parts of ethanol, 9.1 parts of acetic acid and 28.8 parts of a 2.5% by weight solution of a silicone type surface active agent in n-propanol, and 19.9 parts of a methanol dispersion of colloidal silica (having an average particle size of 12±1 nm and a solid content of 30%) and 25.7 parts of tetra-n-butyl titanate were added to the mixed solution at room temperature with stirring to form a coating composition.

(e) Preparation of High-Refractive-Index Intermediate Coating Film

The treated lens obtained in (c) above was coated with the high-refractive-index coating composition prepared in (d) above in the same manner as adopted in (c) above. The coated lens was heated and dried at 100° C. for 2 hours to obtain a high-refractive-index intermediate coating film.

(f) Preparation of Finely Divided Silica-Containing Film

(i) Preparation of Hydrolyzed Silane

A mixture comprising 6.7 parts of methyltrimethoxysilane, 2.2 parts of γ-chloropropyltrimethoxysilane and 6.7 parts of n-propyl alcohol was cooled to 10° C., and 3.3 parts of 0.01N aqueous solution of hydrochloric acid was dropped to the mixture with stirring. After completion of the dropwise addition, the mixture was stirred at room temperature of 1 hour to obtain a hydrolyzed silane.

(ii) Preparation of Coating Composition

A mixture comprising 17.8 parts of the above-mentioned hydrolyzed silane, 111.5 parts of n-propyl alcohol, 15.8 parts of ethylcellosolve, 47.7 parts of water and 2.0 parts of a 5% by weight solution of a silicone type surface active agent in n-propyl alcohol was sufficiently stirred, and 14.8 parts of a methanol dispersion of colloidal silica and 0.45 part of aluminum acetylacetonate were added and the mixture was sufficiently stirred to form a coating composition having a solid content of 4.50% by weight.

(iii) Coating and Curing

The coating composition prepared in (ii) above, which was maintained at 31° C., was spin-coated on the high-refractive-index intermediate coating film obtained in (e) above. The coating was treated for 30 minutes in a thermostat constant-humidity device maintained at a temperature of 80° C. and an absolute humidity of 44.0 g/Kg of air and was then heat-cured at 93° C. for 4 hours in a drier to obtain a lens having a finely divided silica-containing coating film on the surface. The spin-coating conditions were a rotation number of 3500 rpm and a rotation time of 30 seconds.

The total ray transmission of the obtained lens was 96.5%.

(2) Preparation of Curing Coating Film

A silicone type curing coating film was formed on the silica-containing coating film obtained in (1) above in the same manner as described in Example 5.

(3) Evaluation of Properties

In addition to the properties described in (6) of Example 1, the following properties were evaluated. The obtained results are shown in Table 3. The total ray transmission was 96.5% and it was confirmed that the total ray transmission was not changed but kept good.

(a) Steel Wool Hardness

The coated surface was rubbed with steel wool #0000 and the scratch degree was determined according to the following scale.

A: not scratched even by strong rubbing
B: slightly scratched by considerably strong rubbing
C: scratched by weak rubbing
D: easily scratched by nail

EXAMPLE 10

The procedures of Example 9 were repeated in the same manner except that formation of the curing coating film on the silica-containing coating film was changed as described below. The obtained results are shown in Table 3.

(1) Preparation of Curing Coating Composition

To 20 parts of an A-B type acrylic block copolymer comprising a fluoroalkyl group as one component (Modiper F110 supplied by Nippon Yushi K.K., hydroxyl value=36, solid content=30% by weight) were added 5.06 parts of a 15% by weight solution of Coronate EH (supplied by Nippon Polyurethane Kogyo K.K.) in methylisobutylketone/cyclohexanone (40/60 weight ratio) and 0.34 part of a 0.0001% by weight solution of dibutyltin dilaurate in methylisobutylketone/cyclohexanone (40/60 weight ratio), and the mixture was stirred to form a solution. Then, 1.2 parts of the solution was diluted with 135.2 parts of methylisobutylketone and 202.8 parts of cyclohexanone to obtain a coating composition.

(2) Curing

The coating film was heat-cured in a drier in which hot air maintained at 100° C. was circulated.

The anti-reflection property was not changed but kept good.

TABLE 3

| Test Results | Example 9 | Example 10 |
| --- | --- | --- |
| Stationary contact angle (°) to water | 101.4 | 110.0 |
| Water repellancy | o | o |
| Appearance | good | good |
| Surface slip | o | o |
| Steel wool hardness | A | A |

I claim:

1. An anti-reflection optical article having excellent stain resistance, scratch resistance and processability, which comprises a substrate, a single-layer or multilayer anti-reflection film at least the outermost layer of which being composed of silicon dioxide and which is formed on the substrate by the PVD method, and a silanol-terminated polysiloxane having a number average molecular weight of 1,000 to 1,000,000 formed on the surface of the anti-reflection film, wherein the surface reflectance of the optical article is lower than 3% and the stationary contact angle to water is at least 60°.

2. The anti-reflection optical article as set forth in claim 1, wherein the thickness of the silanol-terminated polysiloaxane is 0.0005 to 0.5 μm.

3. The anti-reflection optical article as set forth in claim 1, which is an optical element.

4. The anti-reflection optical article as set forth in claim 3, wherein the optical element is a spectacle lens.

5. The anti-reflection optical article as set forth in claim 1, wherein the optical element is a CRT filter.

6. The anti-reflection optical article as set forth in claim 1, wherein a hard coat layer is interposed between the substrate and the anti-reflection film.

7. The anti-reflection optical article as set forth in claim 6, wherein the hard coat layer contains fine particles of silica having an average particle size of 1 to 200 nm.

8. An anti-reflection optical article as set forth in claim 6, wherein the hard coat layer comprises a silicon compound represented by the following general formula [II] and/or a hydrolysis product thereof:

$$R^1{}_a R^2{}_b Si(OR^3)_{4-a-b} \quad [II]$$

wherein $R^1$ and $R^2$ each stand for an alkyl group, an alkenyl group, an aryl group or a hydrocarbon group having a halogen group, an epoxy group, a glycidoxy group, an amino group, a mercapto group, a methacryloxy group or a cyano group, $R^3$ stands for an alkyl group having 1 to 8 carbon atoms, an alkoxyalkyl group, an acyl group or a phenyl group, and a and b are 0 or 1 and (a+b) is 1 or 2.

9. An anti-reflection optical article as set forth in claim 1, wherein an electroconductive layer is interposed between the substrate and the anti-reflection film.

* * * * *

UNITED STATES PATENT AND TRADEMARK OFFICE
CERTIFICATE OF CORRECTION

PATENT NO. : 4,765,729

DATED : August 23, 1988

INVENTOR(S) : Takashi TANIGUCHI

It is certified that error appears in the above-identified patent and that said Letters Patent is hereby corrected as shown below:

Column 6, line 15, change "a" to --an--.

Column 18, line 18, change "claim 1" to --claim 3--.

Signed and Sealed this

Twenty-first Day of March, 1989

Attest:

DONALD J. QUIGG

*Attesting Officer*  *Commissioner of Patents and Trademarks*